(12) United States Patent
Gehrig et al.

(10) Patent No.: US 8,686,175 B2
(45) Date of Patent: Apr. 1, 2014

(54) PREPARATION OF SILOXANES

(75) Inventors: Amy Gehrig, Merrill, MI (US); Kelly Humburg, Midland, MI (US); Kimmai T. Nguyen, Midland, MI (US); Michael David Telgenhoff, Midland, MI (US); Robert Wells, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 216 days.

(21) Appl. No.: 13/130,371

(22) PCT Filed: Nov. 13, 2009

(86) PCT No.: PCT/US2009/064318
§ 371 (c)(1),
(2), (4) Date: May 20, 2011

(87) PCT Pub. No.: WO2010/074831
PCT Pub. Date: Jul. 1, 2010

(65) Prior Publication Data
US 2011/0237816 A1    Sep. 29, 2011

Related U.S. Application Data

(60) Provisional application No. 61/122,764, filed on Dec. 16, 2008.

(51) Int. Cl.
*C07F 7/00*    (2006.01)

(52) U.S. Cl.
USPC ......................................... 556/451; 556/450

(58) Field of Classification Search
None
See application file for complete search history.

(56) References Cited

U.S. PATENT DOCUMENTS

| | | | |
|---|---|---|---|
| 3,694,405 | A | 9/1972 | Litteral |
| 5,384,383 | A | 1/1995 | Legrow et al. |
| 5,408,025 | A | 4/1995 | Thompson et al. |
| 5,534,608 | A | 7/1996 | Thompson et al. |
| 6,284,859 | B1 | 9/2001 | Hupfield et al. |
| 6,346,593 | B1 | 2/2002 | Hupfield et al. |
| 6,448,196 | B1 | 9/2002 | Eglin et al. |
| 6,809,053 | B2 | 10/2004 | Nakayama et al. |
| 7,196,153 | B2 * | 3/2007 | Burkhart et al. .............. 528/23 |
| 2004/0147703 | A1 | 7/2004 | Burkhart et al. |
| 2005/0165187 | A1 | 7/2005 | Kunzler et al. |
| 2006/0155089 | A1 | 7/2006 | Ferenz et al. |
| 2006/0241270 | A1 | 10/2006 | Burkhart et al. |
| 2006/0293481 | A1* | 12/2006 | Seelye et al. .................... 528/32 |

FOREIGN PATENT DOCUMENTS

| | | |
|---|---|---|
| EP | 665256 | 2/1995 |
| EP | 694554 | 1/1996 |
| EP | 1008598 | 6/2000 |
| EP | 1008610 | 6/2000 |
| EP | 1008612 | 6/2000 |
| JP | 2002-060393 | 2/2002 |
| JP | 2004-250619 | 9/2004 |
| WO | 9211322 | 7/1992 |
| WO | 9306838 | 4/1993 |
| WO | 9526746 | 10/1995 |
| WO | 9618745 | 6/1996 |
| WO | 9635700 | 11/1996 |
| WO | 9640202 | 12/1996 |
| WO | 9640857 | 12/1996 |
| WO | 9927100 | 6/1999 |
| WO | 2007002344 | 1/2007 |
| WO | 2009065641 | 5/2009 |
| WO | 2010031654 | 3/2010 |

OTHER PUBLICATIONS

Hamciuc et al., Reaction Conditons Study in Linear H-Functional Polysiloxane Synthesis, J.M.S.—Pure Appl. Chem., A35(12), pp. 1957-1970 (1998).

* cited by examiner

*Primary Examiner* — Sudhakar Katakam
(74) *Attorney, Agent, or Firm* — Matthew T. Fewkes

(57) ABSTRACT

The invention relates to a process for producing siloxanes comprising reacting at least two siloxanes in the presence of an ion exchange resin catalyst comprising from 6 to 19 weight %, based upon the dry weight of the ion exchange resin catalyst, water, at a temperature from ambient to 110° C. The invention also relates to a process for reusing the ion exchange resin catalyst after the reacting of the at least two siloxanes in the presence of the ion exchange resin catalysts comprising adding water to the ion exchange resin catalyst to readjust the water content to from 6 to 19 weight % water, based on the dry weight of the catalyst, and then reacting at least two siloxanes in the presence of the readjusted water content ion exchange resin catalyst.

11 Claims, No Drawings

PREPARATION OF SILOXANES

CROSS-REFERENCE TO RELATED APPLICATIONS

This application is a U.S. national stage filing under 35 U.S.C. §371 of PCT Application No. PCT/US09/64318 filed on Nov. 13, 2009, currently pending, which claims the benefit of U.S. Provisional Patent Application No. 61/122,764 filed Dec. 16, 2008, under 35 U.S.C. §119 (e). PCT Application No. PCT/US09/64318 and U.S. Provisional Patent Application No. 61/122,764 are hereby incorporated by reference.

BACKGROUND OF THE INVENTION

Siloxanes may be produced from the hydrolysis of organohalosilanes, which are typically produced in the direct process where silicon metal is reacted with an organohalide in the presence of catalyst, such as copper chloride. Processes have been explored to influence the production of some siloxanes over others in the hydrolysis of organohalosilanes, but these methods have limitations. There have also been processes developed to produce siloxanes from other siloxanes by rearrangement or equilibration reactions.

One type of such equilibration reaction comprises reacting siloxanes in the presence of an equilibration catalyst such as an ion exchange resin catalyst. However, the reaction rates and ability to reuse ion exchange catalysts can be improved with these equilibration catalysts. The ion exchange catalyst is typically severely reduced after a single use in one equilibrium reaction such that new ion exchange resin catalyst must be used in subsequent equilibrium reactions. Thus, the reaction time and disposal of the ion exchange catalyst can add significant costs to equilibration processes for producing siloxanes.

The inventors have found that the time of reaction for equilibrium reactions including ion exchange resin catalysts may be reduced by adjusting the water content, within limits, of the ion exchange resin catalyst in the reaction. In some cases, the time of reaction can be reduced by as much as 50% compared to when equilibrium reactions are conducted with an ion exchange resin outside of the water content limits described herein. The inventors have also found that by readjusting the water content of an ion exchange catalyst to within limits after it has been used in an equilibrium reaction that the ion exchange resin catalyst may be reused in subsequent reactions.

BRIEF SUMMARY OF THE INVENTION

The process is for producing siloxanes and comprises reacting at least two siloxanes in the presence of an ion exchange resin catalyst comprising from 6 to 19 weight % water, based upon the dry weight of the ion exchange resin catalyst and at a temperature from ambient to 110° C. The invention also relates to a process for reusing the ion exchange resin catalyst after the reacting of the at least two siloxanes in the presence of the ion exchange resin catalysts comprising adding water to the ion exchange resin catalyst to readjust the water content to from 6 to 19 weight % water, based on the dry weight of the catalyst, and then reacting at least two siloxanes in the presence of the readjusted water content ion exchange resin catalyst.

DETAILED DESCRIPTION OF THE INVENTION

The invention is a process for the preparation of siloxanes by rearrangement of the siloxane bonds by reacting at least two siloxanes in the presence of an ion exchange resin catalyst having 6-19 weight % water, based on the dry weight of the ion exchange resin catalyst.

The at least two siloxanes comprise a first and a second siloxane. The first siloxane may be any organosiloxane having an Si—O—Si bond. In one embodiment, the first siloxane is a cyclosiloxane, non-cyclosiloxane, or mixture thereof.

Suitable cyclosiloxanes, also known as cyclic siloxanes, are well known and commercially available materials. The cyclosiloxanes have the general formula $(R_2SiO)_n$, wherein each R is independently hydrogen or a hydrocarbyl group, and n is an integer from 3 to 12, from 3 to 8, from 4 to 6, 4, 5 or 6. In one embodiment, each R is independently a hydrogen or a C1-C20 hydrocarbyl group; in another embodiment, a hydrogen or a C1-C10 hydrocarbyl group; in another embodiment, hydrogen or a C1-C7 hydrocarbyl group; in another embodiment, hydrogen or a C1 to C4 hydrocarbyl group; and in another embodiment, methyl. Examples of hydrocarbyl groups are methyl, ethyl, n-propyl, trifuoropropyl, n-butyl, sec-butyl, tertiary-butyl, vinyl, allyl, propenyl, butenyl, phenyl, tolyl and benzoyl. In one embodiment, at least 80% of all R groups are methyl or phenyl groups; and in another embodiment, at least 80% of the R groups are methyl. In one embodiment, substantially all R groups are methyl. Examples of suitable cyclic siloxanes are octamethylcyclotetrasiloxane, decamethylcyclopentasiloxane, penta (methylvinyl) cyclopentasiloxane, tetra (phenylmethyl) cyclotetrasiloxane, tetramethyhydrocyclotetrasiloxane, and pentamethyhydrocyclopentasiloxane. In one embodiment, the cyclic siloxane is a mixture of cyclic siloxanes; in another embodiment, the cyclic siloxane comprises octamethylcyclotetrasiloxane and decamethylcyclopentasiloxane; in another embodiment, the cyclic siloxane comprises octamethylcyclotetrasiloxane or decamethylcyclopentasiloxane; in another embodiment, the cyclic siloxane comprises octamethylcyclotetrasiloxane.

Instead of or in addition to the cyclic siloxane described above, the first siloxane may be any organosiloxane material having units of the general formula $R_aSiO_{(4-a)/2}$, wherein R is as defined above, and "a" has a value from 0 to 3, 1 to 3, or 1.8 to 2.2. In one embodiment, the first organosiloxane comprises a dialkylsiloxane; and in another embodiment, the first organosiloxane comprises a dimethylsiloxane. In one embodiment, the first organosiloxane comprises a substantially linear material, which is end-blocked with a siloxane group of the formula $R_3SiO_{1/2}$, wherein each R is as defined above.

The number of silicon atoms comprising the first siloxane can vary. In one embodiment, the first siloxane is an organosiloxane material having between 2 and 200 silicon atoms; in another embodiment, from 3 to 150 silicon atoms; and in another embodiment, from 3 to 20 silicon atoms.

The amount of first siloxane as used herein may vary. Typically, the first siloxane is from 10 to 99 weight %, based on the weight of the reaction mixture; in another embodiment, the first siloxane is from 50 to 95 weight %, based on the weight of the reaction mixture; in yet another embodiment, the first siloxane is from 65 to 85 weight %, based on the weight of the reaction mixture. One skilled in the art would know how to adjust the amount of first siloxane with the second siloxane to achieve a desired chain length siloxane produced by the process. The reaction mixture, as used herein, refers to all reactants including siloxane, catalyst and solvent, if present.

The second siloxane is an endblocker. The endblocker, together with the quantities of the other ingredients, controls the molecular weight of the polysiloxane resulting from the process with more endblocker resulting in lower molecular weight polymers. Suitable endblockers include polysiloxanes in the molecular weight range from 118 grams per mole upwards. In one embodiment, the endblocker is a polysiloxane or polydimethylsiloxane of the general formula $MD_xM$ where M is $R_3SiO—$, D is $—SiR_2O—$, wherein R is as described above and x has a value from 0 to 20 or from 6 to 9. For example, the endblocker may be, hexamethyldisiloxane. In one embodiment, the second siloxane has at least one silicon-bonded hydrogen atom. Examples of second siloxanes with at least one silicon-bonded hydrogen atom are tetramethyldisiloxane, hexamethyltrisiloxane, octamethyltetrasiloxane, wherein the hydrogen atoms are either on the terminal or internal units.

The number of silicon atoms of the second siloxane may vary. In one embodiment, the number of silicon atoms is from 2 to 200; in another embodiment, the number of silicon atoms is from 2 to 100; in another embodiment, from 2 to 50; and in another embodiment from 2 to 10. Siloxanes having silicon-bonded R groups are well known in the art and are commercially available. They can be made by techniques known in the art, for example, by hydrolysis of an organochlorosilane.

As described, the amount of endblocker useful herein is dependent on the desired polymer chain length and can be determined using routine experimentation for one skilled in the art. Typically, from 0.1 to 75 weight percent of the reaction mixture is endblocker. In one embodiment, the endblocker is from 0.1 to 50 weight % of the reaction mixture. The reaction mixture, as used herein, refers to all reactants including all siloxanes, catalyst, and solvents.

In one embodiment, the endblocker comprises at least one silicon-bonded hydrogen atom, and the first siloxane comprises essentially zero silicon-bonded hydrogen atoms per molecule. In this embodiment, the ratio of first and second siloxane is such to give from 50 to 10,000 parts per million (ppm) by weight silicon-bonded hydrogen, based upon the weight of all the siloxane in the reaction mixture; in another embodiment, the ratio gives from 100 to 5000 ppm silicon-bonded hydrogen, based upon the weight of all the siloxane in the reaction mixture; in another embodiment, the ratio give from 200 to 4000 ppm silicon-bonded hydrogen, based upon the weight of all the siloxane in the reaction mixture. The ppm of silicon-bonded hydrogen can be varied either by varying the molecular weight of the endblocker while maintaining the number of silicon-bonded hydrogen groups per molecule endblocker, by varying the amount of endblocker comprised in the process, or by a combination of varying the molecular weight and amount of endblocker in the process. Varying the ratio of first siloxane and endblocker will influence the molecular weight of the siloxane resulting from the process. One skilled in the art would know how to vary the ppm of silicon-bonded hydrogen in the process by varying the molecular weight and quantity of the endblocker in the process to vary the molecular weight of the siloxane produced.

The ion exchange catalyst is a heterogeneous acid catalyst. Catalysts useful are acid ion exchange resins such as polystyrene divinylbenzene, sold as Dowex® DR-2030 produced by Dow Chemical Company, Midland, Mich., and Amberlyst® 15 produced by Rohm and Hass Co.

The acid ion exchange resin catalyst of the process comprises from 3 to 19 weight % water, based upon the dry weight of the acid ion exchange resin catalyst. In another embodiment, the acid ion exchange resin catalyst contains from 6 to 19 weight % water, based upon the dry weight of the acid ion exchange resin catalyst, at the start of the reaction; in another embodiment, the acid ion exchange resin catalyst contains from 6 to 13 weight % water, based upon the dry weight of the acid ion exchange resin catalyst, in another embodiment, the acid ion exchange resin catalyst contains from 9 to 12 weight % water, based upon the dry weight of the acid ion exchange resin catalyst.

Water % may be determined by weight loss on a drying balance for fresh acid ion exchange resin catalyst. For example, water % is determined by placing a 4 inch aluminum weight dish on a weight loss analyzer balance. The balance is tared to a weight of 0 grams. The acid ion exchange resin catalyst is poured onto the aluminum plate until a thin layer covers the entire area of an aluminum plate (approximately 2.8 grams). The top of the balance is closed to allow heating and the acid ion exchange catalyst is heated to and held at 150° C. When the weight loss of the acid ion exchange resin catalyst changes less than 0.5% of the initial loaded weight for 60 seconds, the balance is cooled and the measurement stopped. This weight, after the measurement is stopped, is the "dry weight" of the acid ion exchange resin catalyst as used herein. Water content is the initial weight of the sample minus the final weight of the sample divided by the final weight of the sample multiplied by 100. When the weight % water of the acid ion exchange resin catalyst, as supplied, is below the lower limit of the desired range, the water content is raised by adding water to the acid ion exchange resin catalyst or the reaction mixture to bring the water within desired range. When the water of the acid ion exchange resin catalyst is above the upper limit of the desired water range, the acid ion exchange resin catalyst water content is reduced to bring it within the desired range. The water of the acid ion exchange resin catalyst may be reduced by, for example, drying in a drying oven or by running the process with Si—H containing organosiloxane to consume enough water to bring the acid ion exchange resin catalyst water content within the desired range. When the acid ion exchange resin catalyst is reused, the water content of the acid ion exchange resin catalyst typically must be increased to keep or bring the catalysts in the desired water content range.

When Si—H containing siloxane is the first or second siloxane of the initial reaction and is the only functional group reacting with water, the water to be added to the acid ion exchange resin catalyst is determined by measuring the Si—H content (i.e., the amount of silicon-bonded hydrogen atoms) in all the siloxane prior to or near the start of the initial reaction with fresh acid ion exchange resin catalyst and at the end of the reaction. The difference of the values at the start and at the end is then determined. The difference of Si—H content is the amount of Si—H that has reacted with the water present to produce siloxane and hydrogen gas, with one part water reacting with two parts Si—H. Therefore, the parts water that are added to the acid ion exchange resin catalyst or the reaction mixture for subsequent runs may be determined by subtracting one part water for two parts Si—H reacted as determined by the difference in Si—H from the start to the finish of the reaction.

The Si—H is determined by infrared spectroscopy using the peak at 2129 cm$^{-1}$. The area of the peak is measured and compared to known standards of Si—H containing materials based on known IR procedures. One skilled in the art would know how to add water to the acid ion exchange resin catalyst to bring the weight % water of the catalyst into the ranges specified above. Adjusting the catalyst water to within the ranges herein described unexpectedly increases the rate of reaction and the ability to reuse the acid ion exchange resin catalyst.

Where the first and second siloxane do not contain Si—H groups, the amount of water to be added, if any, to maintain the activity of the catalyst in subsequent runs with the same acid ion exchange catalyst can be determined by running a series of runs to determine the optimum amount of water to add to bring the water content of the acid ion exchange resin back into the desired range and optimize reaction rate. Therefore, based upon the functional group, such as vinyl, on the siloxane, one skilled in the art can determine the amount of water which reacts with the particular functional group on the siloxane and that must be replaced in the catalyst to optimize reaction rate in subsequent reactions with the same catalyst.

The amount of catalyst in the reaction mixture can vary. Although there is really no upper limit, the amount of catalyst is typically from 0.1 to 75 weight % of the reaction mixture. In another embodiment, the catalyst is from 0.1 to 5 weight % of the reaction mixture, and in yet another embodiment, the catalyst is from 0.5 to 1.5 weight % of the reaction mixture.

The temperature of the reaction may vary. In one embodiment, the temperature of the reaction is from ambient to 110° C.; in another embodiment, the reaction temperature is from 20 to 110° C.; in another embodiment, the reaction temperature is from 23 to 80° C. The upper limit of the reaction temperature is the temperature where the catalyst starts to decompose or cleave into the product as a contaminant. One skilled in the art would know how to adjust the reaction temperature.

The pressure at which the invention is conducted may vary from atmospheric to superatmospheric. In one embodiment, the pressure is from 27 to 16000 kPa; in another embodiment, the pressure is from 67 to 5100 kPa; and in yet another embodiment, the pressure is from 93 to 1025 kPa. The pressure as used herein is actual pressure. One skilled in the art would know how to monitor and adjust the pressure of the invention by, for example, feeding high pressure nitrogen into the reactor headspace and venting.

The process according to the invention can be used to make a whole range of organopolysiloxanes, including liquid polymers and gums of high molecular weight, for example from $1\times10^6$ to $100\times10^6$. The molecular weight of the organopolysiloxanes is affected by the concentration of materials used in the reaction. The catalyst is sufficiently active to enable the formation of polymers in a reasonable time at a low catalyst concentration. Thus the process according to the invention will be useful for making organopolysiloxanes having units of the general formula $R_aSiO_{(4-a)/2}$ wherein R is as defined above and "a" has a value from 0 to 3. The organopolysiloxanes produced, are those in which the value of a is 2 for practically all units, except for the end-blocking units, and the siloxanes are substantially linear polymers of the general formula $R(R_2SiO)_pSiR_3$ wherein R is as defined above and p is an integer. It is, however, also possible that small amounts of units wherein the value of a is 0 or 1 are present. Polymer with such units in the chain would have branching present. In one embodiment, each R independently denotes a hydrogen, hydroxyl group or an aryl or an alkyl group such as methyl or phenyl. The viscosity of the organopolysiloxanes which may be produced by the process using an ion exchange resin catalyst according to the present invention with a water content (%) within the range according to the present invention may be in the range of from a 3 mm$^2$/s at 25° C. to many million mm$^2$/s at 25° C., depending on the reaction conditions and raw materials used in the method. In one embodiment, the viscosity of the organosiloxanes produced is from 3 mm$^2$/s to 500 mm$^2$/s, alternatively from 3 mm$^2$/s to 150 mm$^2$/s.

The reaction may be carried out in any suitable reaction vessel. For example, a batch tank or pressure vessel may be used having means to agitate the reaction mixture such as a propeller blade and baffles.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %.

Example 1

To a 1200 gallon agitated carbon steel pressure vessel equipped with an agitator with two flights containing 3 rounded blades in each flight and a dip pipe for loading material was added octamethylcyclotetrasiloxane ($D_4$) and tetramethyldisiloxane at a ratio to give the nominal ppm silicon-bonded hydrogen (Si—H) content listed in Table 1. Next, 1%, based on the weight of the silicone and ion exchange resin catalyst, polystyrene divinylbenzene sulfonic acid (Dowex 2030 Monosphere), was added to the vessel. The water % of the ion exchange resin catalyst was 3.5%, based on the dry weight of the catalyst, as supplied. Water was then added to bring the water % of the ion exchange catalyst, based upon the weight of the catalyst, to the value listed in Table 1. The contents of the vessel were then agitated for 16 hours (7 hours for run numbers 13-15). After agitation, the ion exchange resin catalyst was allowed to settle for approximately 1 hour. After 1 hour, the siloxane was sampled for the amount of $D_4$ in the sample. The $D_4$ content was measured by gas chromatography (GC) using an internal standard of n-undecane. The GC was conducted with a 30 meter fused silica column with a film thickness of 0.25 um. The oven program holds 1 minute at 60° C. and then ramps to 320 C at 15° C. per minute. The injection port is held at 300° C. with a column helium flow of 3.4 ml/min and a split ratio of 40:1. An FID detector is employed at 300° C. The injection size is 1 ul. Response factors are assumed as follows: undecane (1.000), D4 (2.03), D5 (1.95). Two grams of the material was mixed in a vial with 0.03 grams of n-undecane and 4.0 grams of ethyl ether. The Si—H content was determined by infrared spectroscopy. Using the peak at 2129 cm$^{-1}$, the area of the peak was measured and compared to known standards of Si—H containing materials based on known IR procedures. The Si—H was measured by IR initially after the load was completed.

TABLE 1

Runs at different catalyst water contents and the resulting $D_4$ percentage after 16 hours.

| Run Number | Nominal Starting Si-H (ppm) | Ion Exchange Resin Catalyst Starting Water (%) | $D_4$ (%) (after reaction for 16 hours) |
|---|---|---|---|
| 1 | 750 | 14.00 | 6.50 |
| 2 | 750 | 7.00 | 6.90 |
| 3 | 750 | 6.00 | 4.70 |
| 4 | 750 | 7.00 | 4.70 |
| 5 | 750 | 19.00 | 12.90 |
| 6 (comparative) | 750 | 22.00 | 14.80 |
| 7 (comparative) | 750 | 22.00 | 15.00 |

TABLE 1-continued

Runs at different catalyst water contents and the resulting $D_4$ percentage after 16 hours.

| Run Number | Nominal Starting Si-H (ppm) | Ion Exchange Resin Catalyst Starting Water (%) | $D_4$ (%) (after reaction for 16 hours) |
|---|---|---|---|
| 8 | 750 | 8.00 | 5.50 |
| 9 | 750 | 19.00 | 13.70 |
| 10 | 750 | 19.00 | 14.80 |
| 11 | 750 | 7.00 | 5.80 |
| 12 (comparative) | 750 | 23.00 | 20.90 |
| 13 (comparative) | 3200 | 1.25 | 12.98% |
| 14 (comparative) | 3200 | 3.00 | 8.71% |
| 15 | 3200 | 6.25 | 3.71% |

The results in Table 1 show that by running the reaction with the water % of the ion exchange catalyst within limits increases the amount of $D_4$ reacted after 16 hours.

Example 2

To a 1200 gallon agitated carbon steel pressure vessel equipped with an agitator with two flights containing 3 rounded blades in each flight and a dip pipe for loading material was added octamethylcyclotetrasiloxane ($D_4$) and tetramethyldisiloxane at a ratio to give the nominal ppm silicon-bonded hydrogen (Si—H) content of 3200 ppm. Next, 1%, based on the weight of the silicone and ion exchange resin catalyst, polystyrene divinylbenzene sulfonic acid (Dowex 2030 Monosphere), was added to the vessel. The ion exchange resin catalyst was 3.5 weight %, based upon the dry weight of the catalyst, water as supplied. Water was then added to bring the water % of the ion exchange resin catalyst, based upon the weight of the catalyst, to 12%. The contents of the vessel were then agitated for 7 hours. After agitation, the ion exchange resin catalyst was allowed to settle for approximately 1 hour. After 1 hour, the siloxane was sampled for the amount of $D_4$ in the sample. The product was then transferred out of the reaction vessel leaving a small amount of material and the ion exchange resin catalyst in the bottom. To the ion exchange resin catalyst was then added 5% water, based upon the dry weight of the ion exchange resin catalyst to increase the water % of the ion exchange catalysts back to 12%. Next, octamethylcyclotetrasiloxane ($D_4$) and tetramethyldisiloxane were added again to the vessel containing the ion exchange resin catalyst at a ratio to give the nominal ppm silicon-bonded hydrogen (Si—H) content listed in Table 2 and the vessel contents agitated again at ambient temperature for 7 hours. After 7 hours, the ion exchange resin catalyst was allowed to settle for 1 hour, and the siloxane sampled and tested for $D_4$. The process was repeated such that water had been added to the ion exchange catalyst and the reaction had been conducted six times with the same ion exchange catalyst with 5 of the reaction runs having been conducted with the ion exchange catalyst re-wet and reused. The $D_4$ content was measured by gas chromatography (GC), and the Si—H content was determined by infrared spectroscopy as described in example 1. The results are listed in Table 2.

TABLE 2

| Run # | Nominal Ion Exchange Resin Catalyst Starting Water (%) | Catalyst | $D_4$ (%) (after reaction for 7 hours) |
|---|---|---|---|
| 1 | 12 | fresh/new | 4.45 |
| 2 | 12 | from run #1 | 3.85 |
| 3 | 12 | from run #2 | 4.02 |
| 4 | 12 | from run #3 | 3.89 |
| 5 | 12 | from run #4 | 4.14 |
| 6 | 12 | from run #5 | 3.89 |

As can be seen from comparing the results of Table 2 to the comparative examples in Table 1, the ion exchange resin catalyst can be reused with good results by adding water to the catalyst with each new run.

That which is claimed is:

1. A process for preparing siloxanes, comprising:
   reacting at least two siloxanes in the presence of an ion exchange resin catalyst comprising from 6 to 19 weight % water;
   recovering the ion exchange resin catalyst after the reacting;
   adding water to the ion exchange resin catalyst to bring the ion exchange resin to from 6 to 19 weight % water, based upon the dry weight of the ion exchange resin catalyst; and
   reacting at least two siloxanes in the presence of the ion exchange resin catalyst,
   wherein the at least two siloxanes comprise a first siloxane and a second siloxane,
   the first siloxane having units of the general formula $R_aSiO_{(4-a)/2}$, wherein each R is independently a hydrogen or a $C_1$-$C_{20}$ hydrocarbyl group and "a" has a value from 0 to 3; and
   the second siloxane having a formula $MD_xM$ wherein M is $R_3SiO$— and D is —$SiR_2O$—.

2. The process of claim 1, wherein the ion exchange resin catalyst comprises from 6 to 13 weight % water, based upon the dry weight of the ion exchange resin catalyst.

3. The process of claim 1, wherein the ion exchange resin catalyst comprises from 6 to 9 weight % water, based upon the weight of the ion exchange resin catalyst.

4. The process of claim 1, wherein at least one of the siloxanes is poly(methyl)hydrogensiloxane or a cyclic siloxane.

5. The process of claim 1, wherein the siloxanes have between 2 and 200 silicon atoms.

6. The process of claim 1, wherein the reacting is at a temperature from 20 to 110° C.

7. The process of claim 6, wherein the temperature is from 20 to 80° C.

8. The method of claim 1, wherein the water is added to the ion exchange resin catalyst to bring the ion exchange resin to from 6 to 13 weight % water, based upon the dry weight of the ion exchange resin catalyst.

9. The method of claim 1, wherein the ion exchange resin catalyst is styrenedivinylbenzene sulfonic acid copolymer.

10. The method of claim 1, wherein
    the first siloxane has a formula $(R_2SiO)_n$, wherein n is an integer from 3 to 12; and
    wherein in the formula for the second siloxane x has a value from 0 to 20.

11. The method of claim 1, wherein at least one of the siloxanes comprises at least one silicon bonded hydrogen atom and the ion exchange resin catalyst is an acid ion exchange resin.

* * * * *